United States Patent
Lane

(10) Patent No.: US 6,816,087 B2
(45) Date of Patent: Nov. 9, 2004

(54) FLIGHT ATTENDANT ACTUATED WARNING SYSTEM AND METHOD

(76) Inventor: Michael W. Lane, 746 E. 6th Pl., Mesa, AZ (US) 85203

( * ) Notice: Subject to any disclaimer, the term of this patent is extended or adjusted under 35 U.S.C. 154(b) by 54 days.

(21) Appl. No.: 10/213,304

(22) Filed: Aug. 6, 2002

(65) Prior Publication Data

US 2004/0027256 A1 Feb. 12, 2004

(51) Int. Cl.$^7$ .............................................. G08B 21/00
(52) U.S. Cl. ................... 340/945; 340/5.64; 340/573.1; 340/963; 340/988; 244/118.5; 342/36; 701/1; 701/14; 701/200
(58) Field of Search ................................ 340/945, 963, 340/965, 988, 502, 504, 505, 10.1, 573.1, 574, 5.64, 5.65; 244/1 R, 118.5, 121, 183; 701/1, 36, 200, 14; 342/36, 29

(56) References Cited

U.S. PATENT DOCUMENTS

| | | | |
|---|---|---|---|
| 3,680,499 A | * 8/1972 | Bodreau | 244/118.5 |
| 3,704,845 A | * 12/1972 | Ord | 244/118.5 |
| 5,587,704 A | 12/1996 | Foster | |
| 6,127,925 A | 10/2000 | Bosignore et al. | |
| 6,676,078 B2 | * 1/2004 | Cordina | 244/118.5 |

* cited by examiner

Primary Examiner—Davetta W. Goins
(74) Attorney, Agent, or Firm—John D. Lister

(57) ABSTRACT

A flight attendant actuated warning system for alerting a flight crew in a flight deck compartment of an aircraft of a potential hijacking or other troublesome situation includes a receiver unit on the flight deck and at least one portable transmitter unit with a flight attendant in the passenger cabin. In the event of trouble, the flight attendant can actuate the transmitter to transmit a preselected activation signal having a frequency that does not interfere with the avionics and navigational equipment of the aircraft. The signal is received by the receiver unit and activates an audible and visual alarm of the receiver unit to alert the flight crew. The signal may also actuate a radio in the receiver unit that transmits on a preselected frequency, a transponder to squawk a hijacking code, and a vibratory alarm of one or more portable receivers with flight attendants and/or a federal air marshal.

18 Claims, 6 Drawing Sheets

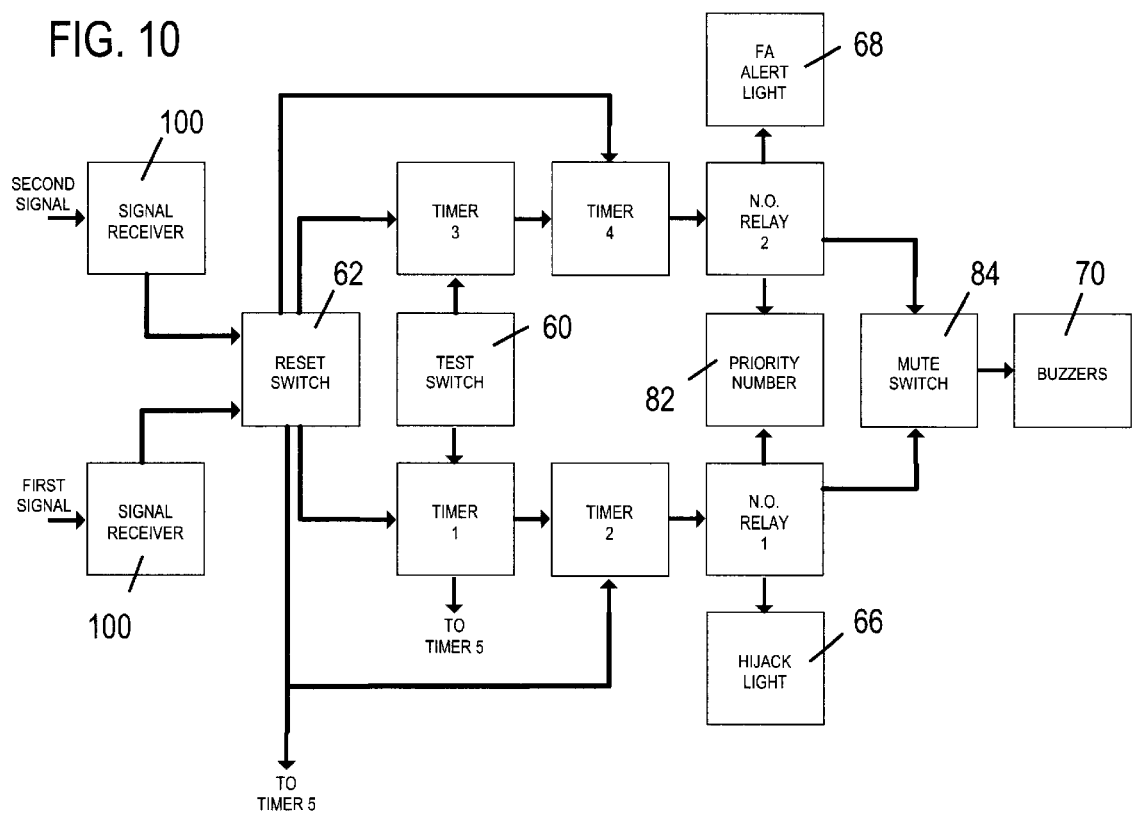

FLIGHT ATTENDANT ACTUATED WARNING SYSTEM AND METHOD

BACKGROUND OF THE INVENTION

The subject invention relates to an aircraft warning system for alerting the flight crew in the flight deck compartment of an aircraft that a troublesome situation is occurring in the passenger cabin, and, more specifically, to a flight attendant actuated warning system that can be actuated by a flight attendant in the passenger cabin without detection for alerting the flight crew in the flight deck compartment that a potential hijacking, passenger initiated disturbance, or other troublesome situation is occurring in the passenger cabin.

Presently, the flight attendant or attendants on a commercial airliner have two ways of contacting the flight crew in the flight deck compartment of the commercial airliner. The flight attendant may contact the flight crew in the flight deck compartment by calling one of the pilots over the interphone or by knocking on the compartment door. The interphone is an internal intercom system of the aircraft that is very much like those used in offices. On a regional airliner, an interphone is located in the front of the passenger cabin in view of at least some of the passengers and is also used by the flight attendant to make passenger announcements. On a regional airliner, there may be no interphone in the rear of the passenger cabin. On a larger commercial airliner, due to the length of the passenger cabin, there may be interphones at both the front and the rear of the passenger cabin. To contact one of the pilots in the flight deck compartment, a flight attendant picks up the handset of the interphone system and pushes a call button. The call button sounds a chime in the cockpit letting the flight crew in the flight deck compartment know that a flight attendant would like to talk with them. After hearing the chime, one of the pilots turns the intercom on and communicates with the flight attendant. Under normal circumstances, communication between the flight attendant(s) and the flight crew on the flight deck through the interphone system works quite well. However, in an emergency, such as a potential hijacking, a passenger initiated disturbance or other troublesome situation, this method of communication presents several serious problems. At least some of the passengers in the passenger cabin can see and/or hear a flight attendant calling the flight crew in the flight deck compartment over the intercom system and where the potential hijackers or the disruptive passenger(s) can see and/or hear a flight attendant making the call, the potential hijacker(s) or disruptive passenger(s) might be spurred into action by the attendant's attempt to make the call thereby further endangering the flight attendant, the other members of the flight crew, and innocent passengers. Getting to the interphone handset can also be a problem or impossible for the flight attendant, perhaps the flight attendant's path to the interphone handset or handsets is blocked by the potential hijacker(s) or disruptive passenger(s) and the flight crew in the flight deck compartment never receives a warning or alert. In a situation such as a potential hijacking where time is of the essence, there may not be time for the attendant to get to a handset of the interphone system and deliver a message to the flight crew on the flight deck. Of course, where a flight attendant must move to the front of the passenger cabin and knock on the door of the flight deck compartment to gain the attention of the flight crew on the flight deck, the situation can only become worse. Extra time would be consumed by the need for one of the pilots to get out of his/her seat, look through the peephole, and open the flight deck door to communicate with the flight attendant. In addition, if one of the pilots unlocks and opens the flight deck door to talk to the flight attendant, this would provide access to the flight deck compartment and that, especially in a potential hijacking situation, could be extremely dangerous for both the flight crew and passengers.

Accordingly, for years there has been and, in view of Sep. 11, 2001, there still is a need for immediate and undetected communication from a flight attendant to a flight crew in the flight deck compartment of the aircraft to alert the flight crew on the flight deck that a potential hijacking, a passenger initiated disturbance or some other troublesome situation or emergency is occurring in the passenger cabin. Such an undetected alert will not further endanger the flight attendant by drawing attention to the fact that the flight attendant is in contact with the flight crew on the flight deck and will enable the flight crew in the flight deck compartment to initiate an appropriate response to the situation. Where there is a potential hijacking, the flight crew in the flight deck compartment will not be blind-sided by the hijackers and can go into a defensive posture taking whatever steps considered appropriate. For example, the flight crew could get ready to deny the hijackers access to the flight deck compartment through the flight deck door; the situation could be communicated to air traffic controllers, the military and other appropriate authorities by the pilot; and/or the pilot could divert to a near by airport, land and thereby prevent the aircraft from being used by the terrorists as they did on September $11^{th}$. With the military alerted the military could stand by and be ready to react to the situation as it unfolds and ensure that the aircraft is not flown into a building or other facility, such as but not limited to an office building, a military installation, a nuclear power plant, athletic stadium, dam, etc.

SUMMARY OF THE INVENTION

The flight attendant actuated warning system and method of the subject invention provides a unique system and method for an immediate and undetected communication from a flight attendant to a flight crew in the flight deck compartment of the aircraft to alert the flight crew on the flight deck that a troublesome situation such as a potential hijacking, a passenger initiated disturbance, or some other troublesome situation or emergency is occurring in the passenger cabin.

The flight attendant actuated warning system of the subject invention includes a receiver unit and one or more portable transmitter units. The receiver unit is located in the flight deck compartment of an aircraft to alert the flight crew on the flight deck of the aircraft in the event a troublesome situation develops in the passenger cabin and at least one and preferably each flight attendant in the passenger cabin of the aircraft carries a portable transmitter unit that can be easily concealed from the passengers in the passenger cabin. Each portable transmitter unit can be actuated by the flight attendant carrying the unit, without detection by the passengers in the passenger cabin, to transmit a preselected activation signal to the receiver unit in the flight deck compartment. To avoid interfering with the function of the avionic and navigational equipment of the aircraft, the preselected signal or signals transmitted by each portable transmitter unit are transmitted at a frequency or frequencies outside a frequency range utilized by the avionic and navigational equipment of the aircraft. When the receiver unit in the flight deck compartment receives a preselected activation signal from a portable transmitter unit located in the passenger cabin of the aircraft (preferably the signal must be transmitted for a preselected activation period of 1 or 2 seconds to minimize false alarms), the receiver unit is activated to audibly and visually alert the flight crew in the flight deck compartment that a troublesome situation is occurring in the passenger cabin of the aircraft.

Preferably, each portable transmitter unit can transmit two or more preselected activation signals and the receiver unit can receive and process the two or more preselected activation signals from each portable transmitter unit of the system. In one embodiment of the subject invention, each portable transmitter unit of the system can transmit two preselected signals and the receiver unit can receive and process the two preselected signals from each portable transmitter unit. The first preselected activation signal transmitted by each transmitter unit is processed by the receiver unit to alert the flight crew in the flight deck compartment that a first troublesome situation is occurring in the passenger cabin, such as but not limited to a potential hijacking. The second preselected activation signal transmitted by each portable transmitter unit is processed by the receiver unit to alert the flight crew in the flight deck compartment that some other troublesome situation is occurring in the passenger cabin, such as but not limited to a confrontation between a flight attendant and a disruptive passenger or air rage.

However, the flight attendant actuated warning system of the subject invention may use portable transmitter units that each transmit three or more preselected activation signals and a receiver unit that can receive and process the three or more preselected activation signals from each portable transmitter unit of the system. Such a system, rather than having only two categories of alert, such as a hijacking alert and a troublesome situation alert other than a hijacking alert, could have a series of alerts, e.g. a level one alert, a level two alert, a level three alert etc., reflecting the seriousness of the situation in the passenger cabin.

Preferably, after the audio and visual alarms of the receiver unit have been activated for a preselected alarm period (e.g. 13 to 15 seconds) through the receipt by the receiver unit of a preselected activation signal from a flight attendant, the receiver unit automatically deactivates the audio and visual alarms and returns the receiver unit to a standby condition so that the receiver unit can again be activated by the future receipt of a preselected activation signal. The receiver unit also includes a manual reset device that may be actuated by one of the members of the flight crew in the flight deck compartment to deactivate the audio and visual alarms before the end of the preselected alarm period and return the receiver unit to a standby state so that the receiver unit is again ready to receive a preselected activation signal from a flight attendant.

In a preferred embodiment of the subject invention, the receiver unit also includes a radio transmitter that transmits on the international emergency frequency or whatever frequency designated by the FAA (Federal Aviation Administration) and/or FCC (Federal Communication Commission). Air traffic controllers and the military continuously monitor the international emergency frequency and by transmitting over this international emergency frequency, the radio transmitter of the receiver unit will not interfere with the air traffic control frequency being used by the aircraft and other aircraft. The radio transmitter can be programmed to automatically transmit the call sign and flight number of the aircraft when the radio transmitter is operating and preferably, includes a microphone for automatically picking up and transmitting voices and other sounds in the flight deck compartment when the radio transmitter is operating. Once the receiver unit has been activated by the receipt of a preselected activation signal that indicates a potential hijacking, if the flight crew does not deactivate and return the receiver unit to a standby state through operation of the manual reset device prior to the expiration of a preselected time period (e.g. such as but not limited to a time which may coincide with but is typically longer than the activation period of the audio and visual alarms), the receiver unit automatically turns on the radio transmitter which begins transmissions on the international or other designated emergency frequency and changes the squawk code of the aircraft's ATC transponder (Air Traffic Control transponder) to the international hijacking code so that air traffic control and the military can identify and track the aircraft on the radar screen that is being hijacked. Once the radio transmitter is turned on and the code transmitted by the aircraft's ATC transponder is changed to the hijacking code, unless the receiver unit is reset using the manual reset switch, the radio transmitter remains on to transmit the aircraft's call sign and the flight number and voices and sounds from the flight deck compartment and the transponder continues to squawk the hijacking code. Preferably, the call sign and flight number are only transmitted for a short period of time so that voices and noises from the flight deck can be better monitored by air traffic control and the military. Thus, with the radio transmitter turned on and transmitting, the air traffic control and the military can monitor what is happening in the flight deck compartment of the aircraft during an attempted hijacking and/or flight deck compartment invasion. Furthermore, since the audio and visual alarms of the receiver unit have been deactivated at the end of the preselected alarm period, a hijacker's attention will not be drawn to the receiver unit and the hijacker(s) will be unaware that their activities in the flight deck compartment are being monitored by the air traffic controllers and the military.

In a preferred embodiment of the subject invention, the flight attendant actuated warning system also includes one or more portable receiver units that may be carried by each flight attendant where there are two or more attendants and any federal air marshal present in the passenger cabin. The receipt by the portable receiver unit of a preselected activation signal from a portable transmitter unit in the passenger cabin for the preselected activation period actuates an alarm to alert other flight attendants and any federal air marshal present that a flight attendant is involved in a potential hijacking or other troublesome situation. Preferably, the portable receiver unit alarm is a silent alarm, e.g. a vibrating device, so that attention will not be drawn to any flight attendant or federal air marshal, a federal air marshal's presence will remain undetected, and the passengers in the passenger cabin will not be aware that an alert has been initiated. The silent alarm will automatically turn off and the portable receiver will automatically be reset to a standby mode after a preselected time period and/or the portable receiver will be provided with a manual reset device to return the portable receiver to a standby mode.

BRIEF DESCRIPTION OF THE DRAWINGS

FIG. 10 is a schematic flow chart of a second electrical circuit that may be used in the receiver unit of a preferred embodiment of the flight attendant actuated warning system of the subject invention that enables the flight attendant to alert the flight crew on the flight deck of either a potential hijacking or other troublesome situation in the passenger cabin.

DESCRIPTION OF THE PREFERRED EMBODIMENTS

Figure 1:
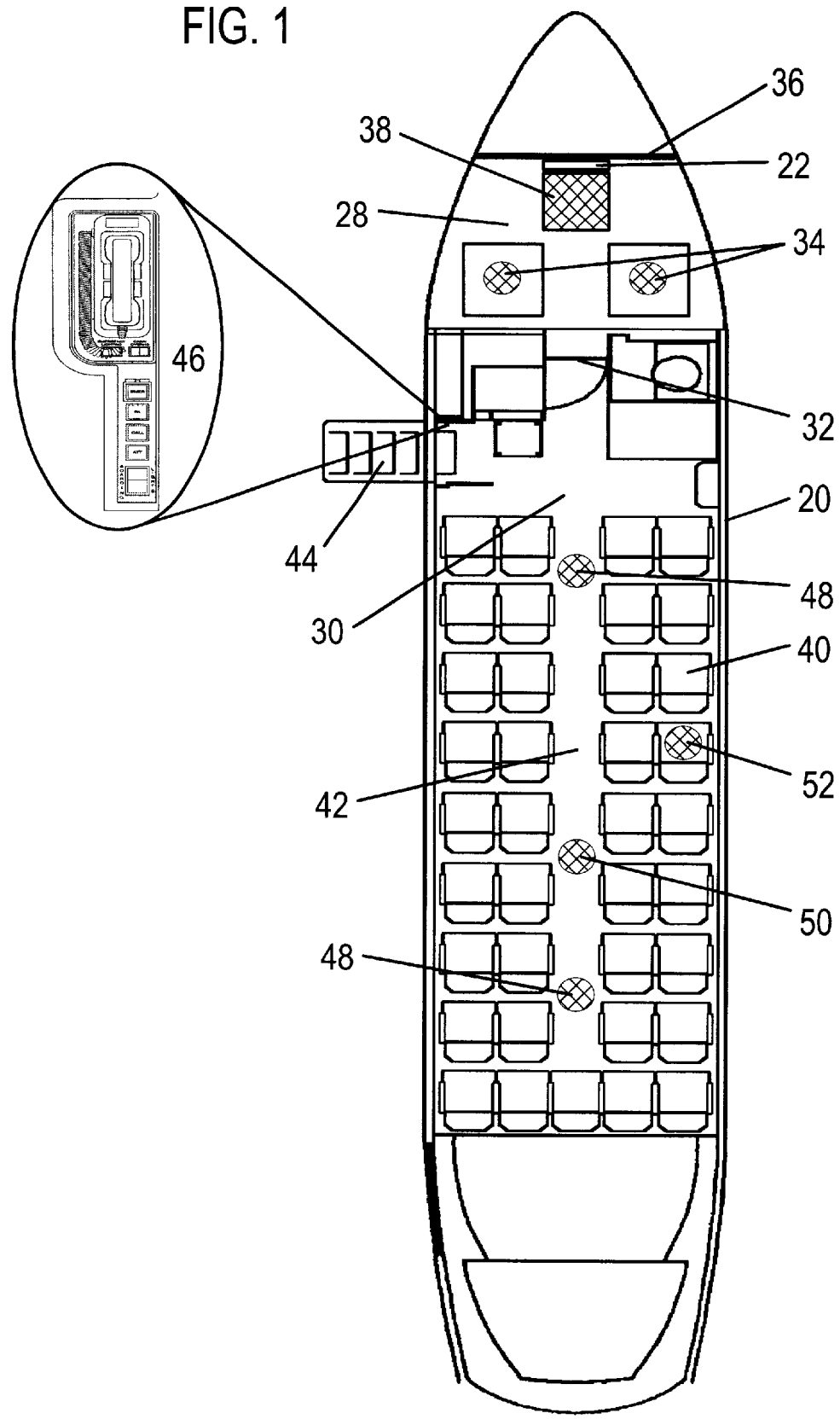
FIG. 1 is a schematic plane view of a passenger cabin and flight crew cockpit of a typical small commercial regional airliner with only one flight attendant.

FIG. 1 schematically illustrates the floor plan of a typical small commercial regional airliner 20 that is serviced by a single flight attendant. While a typical small commercial regional airliner floor plan is used to describe the use of the subject invention, the flight attendant actuated warning system of the subject invention is equally well suited for use on both small and large commercial airliners having two or more flight attendants.

The flight attendant actuated warning system of the subject invention includes: a receiver unit 22 that is activated by one or more preselected activation signals; one or more portable transmitter units 24 for transmitting the one or more preselected activation signals; and may also include one or more portable receiver units 26 that are activated by the one or more preselected activation signals transmitted by the portable transmitter units. Current commercially available transmitters and receivers that can be used in the flight attendant actuated warning system of the subject invention can be programmed to transmit and receive any of more than 8,000 preselected activation signals. For example, a double channel portable transmitter sold by Velleman Components N.V. of Legen Heirweg 33, B-9890 Gavere, Belgium under the trade designation K6706B codelock transmitter can be used to control single or double channel receivers also sold by Velleman under the trade designation V-K6707 and V-K6727 codelock receiver. These transmitters and receivers can be programmed to transmit and receive any of more than 8,000 preselected activation signals. Accordingly, as will be discussed below, the preselected activation signal or signals used with each flight attendant actuated warning system will preferably be unique to that system so that the flight attendant actuated warning system on each aircraft can only be operated with the receiver unit 22, the portable transmitter unit(s) 24, and the portable receiver unit(s) 26 of that specific system and no other system.

As shown in FIG. 1, the commercial airliner 20 includes a flight deck compartment 28 and a passenger cabin 30. A flight deck door 32 that is normally closed and locked during flight separates the flight deck compartment 28 from the passenger cabin 30. The flight deck compartment 28 includes: seating for the flight crew 34 (in this example seating for a pilot and copilot); an instrument panel 36; the receiver unit 22; and a radio stack 38. The passenger cabin 30 includes: seating for the passengers 40; an isle way 42; an air-stair door 44 for boarding and deplaning the aircraft; and a handset 46 of an interphone system. FIG. 1 also schematically shows two potential hijackers 48; a flight attendant 50 with a portable transmitter unit; and a federal air marshal 52 with a portable receiver unit (the other passengers are not shown). The hijackers 48 are blocking the aisle way 42 between the flight attendant 50 and the front of the passenger cabin so that the flight attendant 50 can't reach the interphone handset 46 or the flight deck door 32 to alert the flight crew on the flight deck that a potential hijacking is in progress in the passenger cabin 30. However, the flight attendant 50 by discretely actuating his/her portable transmitter unit 24 can secretly alert both the flight crew 34 on the flight deck and the federal air marshal 52 that a potential hijacking is in progress without bringing attention to him/herself or the federal air marshal.

Figure 2:
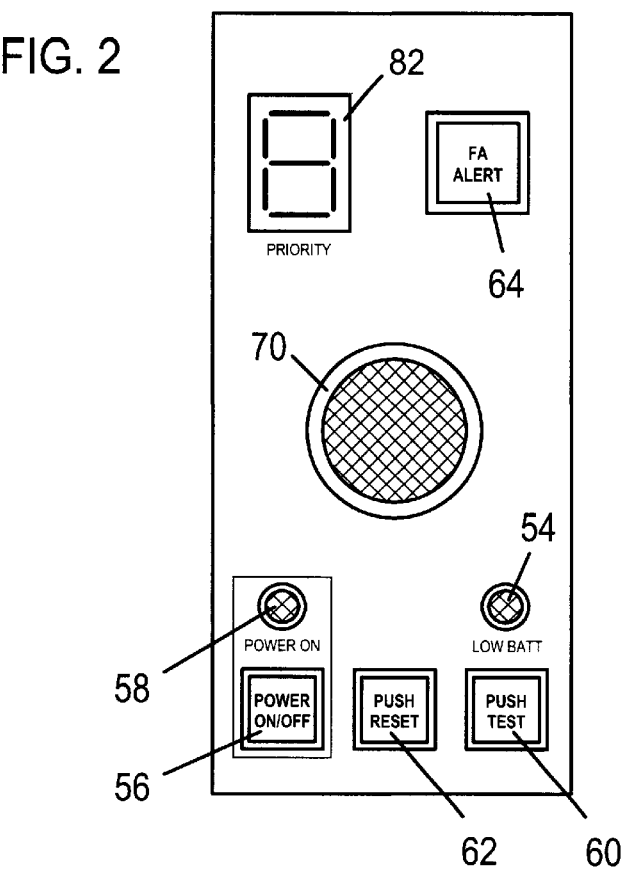
FIGS. 2 to 6 are front views of various embodiments of the receiver unit of the flight attendant actuated warning system of the subject invention that is located in the flight crew compartment of an aircraft.
Figure 3:
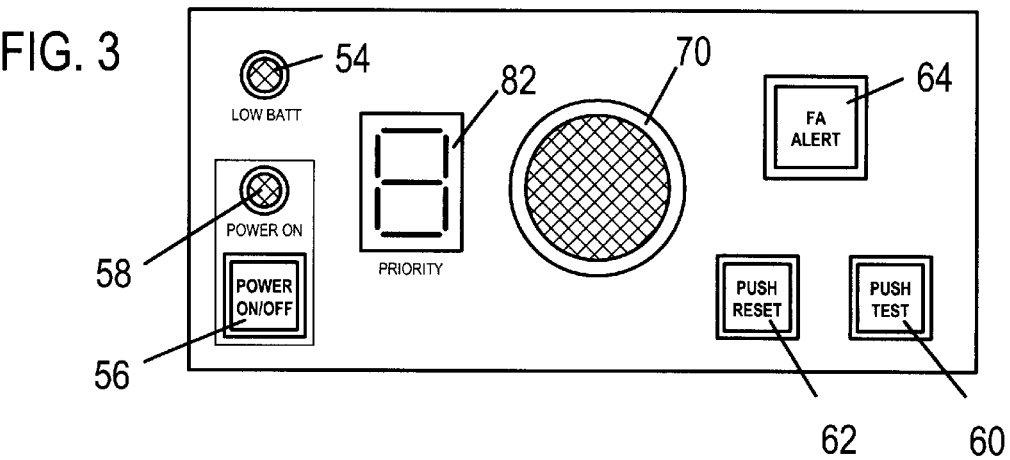

Preferably, the receiver unit 22 of the flight attendant actuated warning system is located in the flight deck compartment 28 on or in the instrument panel 36 between the pilot and copilot and adjacent the radio stack 38. The receiver unit 22 can be mounted with the front or face of the receiver unit oriented vertically as shown in FIG. 2 or horizontally as shown in FIGS. 3 to 6. Preferably, the receiver unit housing will be made of aluminum and may be made in various sizes so that the receiver unit 22 can be mounted in different models of both small and large aircraft.

In a preferred embodiment of the receiver unit 22, the receiver unit 22 is powered by the aircraft's 28-volt DC electrical system and is connected into that system through a conventional quick connect-disconnect plug. The use of the quick connect-disconnect plug enables the receiver unit 22 to be easily installed or removed from the instrument panel 36 and facilitates the servicing of the unit. Where the receiver unit requires a 12 volt power source, the preferred receiver unit 22 includes a voltage reducer that reduces the voltage of the aircraft electrical system from 28 volts to 12 volts and an internal 12-volt backup battery that will power the receiver unit 22 for a selected period of time, preferably at least 30 minutes, in the event the power from the aircraft electrical system is temporarily interrupted or completely fails. A low battery LED light 54, e.g. a yellow LED light, on the face of the receiver unit will illuminate should the 12-volt backup battery need replacement.

The receiver unit 22 is equipped with a power on/off switch 56 and a power on/signal indicator LED light 58, e.g. a red LED light, on the face of the receiver unit. Preferably, the power on/off switch 56 is a push button switch. The power on/signal indicator LED light 58 serves two functions. When the power on/signal indicator LED light 58 is illuminated, the power on/signal indicator LED light 58 indicates that the receiver unit 22 has power and is operational. When the power on/signal indicator LED light 58 flashes off and on at a high rate, e.g. several cycles per second, the power on/signal indicator LED light 58 indicates that the receiver unit 22 is receiving a preselected activation signal from a portable transmitter unit 24 of the fight attendant actuated warning system.

Preferably, the receiver unit 22 is equipped with a test switch 60 which, when actuated, tests all of the alert lights, audible alert buzzers, relays, timing circuits, and if included, a radio transmitter of the receiver unit 22 for a selected test period. The receiver unit 22 also has a reset switch 62 for resetting the receiver unit to a standby mode so that the receiver unit 22 is ready to be activated by the receipt of a preselected activation signal from a portable transmitter unit 24 of the system. Preferably, both the test switch 60 and the reset switch 62 are push button switches. When the test switch 60 has been actuated, if the receiver unit test is not terminated earlier by a member of the flight crew in the flight deck compartment through the use of the reset switch 62, the alert lights and the audible alert buzzers of the receiver unit 22 are operated for the preselected alarm period, e.g. 13 to 15 seconds, and then are automatically turned off placing the receiver unit 22 in the standby mode. When the system includes a radio transmitter, before the receiver unit is automatically returned to its standby mode, the radio transmitter is also turned on, e.g. after 20 seconds, and then turned off through the use of the reset switch 62 or automatically turned off within a few seconds with the illumination of the ATC $T_x$ light on the receiver unit letting the flight crew know the radio transmitter is working.

The receiver unit 22 is equipped with one and preferably two alert lights that are bright enough to be seen in direct sunlight. When the receiver unit 22 is activated by a preselected activation signal received from a portable transmitter unit 24 of the system, the appropriate alert light will be illuminated for the preselected alarm period unless the operation of the alert light is terminated earlier by the use of the reset switch 62. Where the fight attendant actuated warning system only utilizes a single preselected activation signal, such as a system using the receiver units of FIGS. 2 and 3, there is only one alert light 64 to alert the crew that a hijacking, passenger initiated disturbance, or other troublesome occurrence or emergency is occurring in the passenger cabin. Where the fight attendant actuated warning system utilizes at least two preselected activation signals, such as systems using the receiver units of FIGS. 4 to 6, there are two or more alert lights. Preferably, in a flight attendant actuated warning system utilizing only two alert lights, the first alert light 66 is illuminated for a potential hijacking and may be labeled "HIJACK" and the second alert light 68 is illuminated for a passenger initiated disturbance or other troublesome occurrence or emergency that is occurring in the passenger cabin and may be labeled "FA ALERT" for flight attendant alert. In a typical two alert light system, receipt by the receiver unit 22 of a first preselected activation signal from a portable transmitter 24 of the system causes the receiving and activating circuit of the receiver unit 22 to illuminate the first alert light 66 (e.g. the hijacking alert light) for the preselected alarm period and receipt by the receiver unit 22 of a second preselected activation signal from a portable transmitter 24 of the system causes the signal receiving and activating circuit of the receiver unit 22 to illuminate the second alert light 68 (e.g. the troublesome occurrence alert light) for the alarm period.

The receiver unit 22 is normally equipped with two audible alert buzzers 70, preferably piezo buzzers. When activated, the audible alert buzzers 70 will each emit an audible tone loud enough to be heard by the flight crew over the normal noise in the flight deck compartment during flight. The main buzzer is located on the face of the receiver unit 22 and the backup buzzer (not shown) is located within the housing of the receiver unit and provides redundancy for the audible alert function of the receiver unit 22. When the receiver unit 22 is activated by a preselected activation signal received from a portable transmitter 24 of the system, the audible alert buzzers 70 will be activated for the preselected alarm period unless the operation of the audible alert buzzers is terminated earlier by the use of the reset switch 62.

In a preferred embodiment of the fight attendant actuated warning system, the receiver unit 22 is equipped with a VHF radio transmitter. Preferably, the VHF radio transmitter is connected to a microphone 72 on the face of the receiver unit 22 for automatically picking up and transmitting voices and sounds from the flight deck when the radio transmitter is operating. In operation, preferably, the transmitter transmits on the international emergency frequency of 121.50 MHz or another frequency designated by the FAA and/or FCC. All air traffic control facilities and military bases continuously monitor the international emergency frequency and by transmitting over this international emergency frequency, the radio transmitter of the receiver unit will not interfere with the air traffic control frequency being used by the aircraft and other aircraft.

Figure 4:
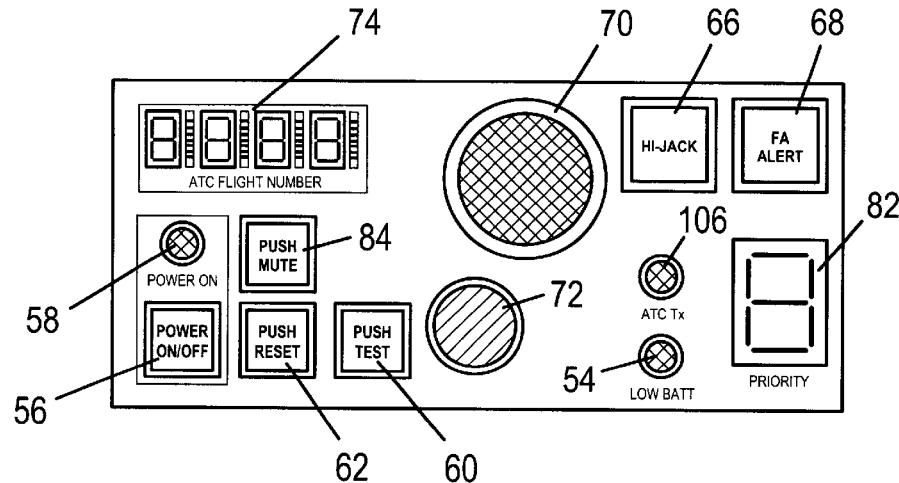
Figure 5:
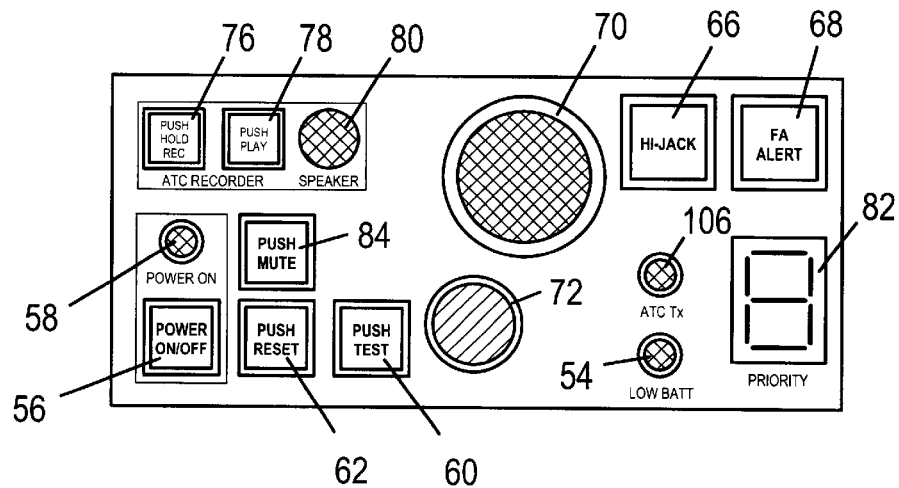
Figure 6:
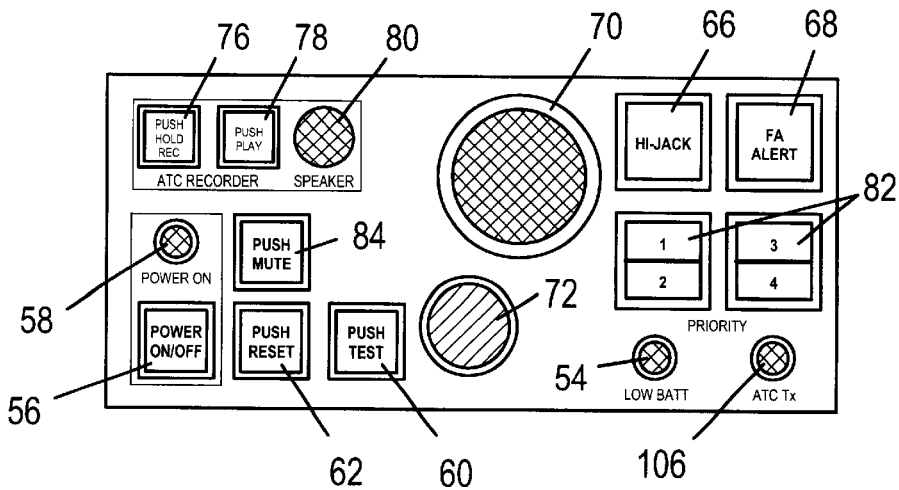

The radio transmitter can include a digital voice recorder that can be programmed to automatically transmit the call sign and flight number of the aircraft when the radio transmitter is operating. One way of inputting the fight number of the aircraft into the digital voice recorder is through the use of a conventional thumb wheel display 74 on the receiver unit as shown in FIG. 4. However, with this arrangement, the company call sign would be coded into the digital voice recorder at the time of manufacture. A second and preferred way of inputting the call sign and flight number of the aircraft into the digital voice recorder would permit the pilot to activate a conventional digital voice recorder of the radio transmitter by pushing and holding in a recording button 76 and verbally inputting the call sign and flight number of the aircraft into the digital voice recorder by merely speaking into the microphone 72 of the VHF radio transmitter as shown in FIGS. 5 and 6. The digital voice recorder may also have a playback button 78 and a speaker 80 so that the pilot could check the digital recording to be sure that the call sign and flight number entered into the recorder are correct.

Where the receiver unit 22 is equipped with a radio transmitter, once the receiver unit 22 has been activated by the receipt of the one preselected activation signal in systems using only one preselected activation signal or the first preselected activation signal (e.g. the hijacking signal) in systems using two preselected activation signals, if the flight crew does not deactivate and return the receiver unit 22 to a standby state through operation of the reset switch 62 prior to the expiration of a preselected time period (e.g. the preselected alarm period of 15 seconds plus an additional time period of 5 seconds), the signal receiving and activating circuit of the receiver unit 22 automatically turns on the radio transmitter which begins transmissions on the international emergency frequency or other designated frequency and may also change the aircraft's ATC transponder squawk code to squawk the hijack code. Once the radio transmitter is turned on and the transponder starts squawking the international hijacking code, unless and until receiver unit 22 is returned to its standby state through the use of the reset switch 62, the radio transmitter remains on and continues to transmit and the ATC transponder continues to squawk the international hijacking code. While the radio transmitter continuously transmits voices and sounds picked up by the microphone 72 in the flight deck compartment until the radio transmitter is turned off, the call sign and flight number of the aircraft may be transmitted by the radio transmitter for only a time period of one or two minutes after which the transmission of the call sign and flight number of the aircraft are terminated. By terminating the transmission of the call sign and flight number after a selected time period, the voices and sounds transmitted by the radio transmitter from the flight deck compartment can be better monitored. With the radio transmitter turned on and transmitting, the air traffic control and the military can monitor what is happening in the flight deck compartment of the aircraft during an attempted hijacking and/or flight deck invasion. Furthermore, since the audio and visual alarms of the receiver unit 22 have been automatically deactivated at the end of the preselected alarm period, a hijacker's or intruder's attention will not be drawn to the receiver unit 22 and the hijacker(s) or intruder(s) will be unaware that their activities in the flight deck compartment are being monitored by the air traffic controllers and the military.

The receiver unit 22 may also contain an indicator, such as but not limited to a numerical priority indicator 82, to inform the flight crew on the flight deck which fight attendant is issuing the alert. Preferably, each flight attendant would have a different priority number with the most senior flight attendant having the number 1, the next flight attendant in seniority having the number 2, and so on. Each portable transmitter unit 24 of the system will transmit a signal or signals unique to that portable transmitter and based on the priority number of the flight attendant. The receiver unit 22 will be able to distinguish between signals and indicate the priority number of the flight attendant issuing the alert through an LED display 82 as shown in FIGS. 2 to 5 or other display 82 as shown in FIG. 6.

A mute switch 84 may also be included in the receiver unit 22 to mute the audio alarm (the buzzers 70) prior to the end of the preselected alarm period without resetting the entire system. Thus, the mute switch 84 permits the visual alarm to continue for the preselected alarm period and will not interrupt the initiating sequence for the radio transmitter and transponder nor power to the radio transmitter once the radio transmitter has begun transmitting. Once the transponder code has been changed by the flight attendant actuated warning system to squawk the international hijacking code, the transponder will continue to squawk the international hijacking code until the code is reset by the pilots after the situation is under control.

As indicated above, the flight attendant actuated warning system includes one or more portable transmitter units 24. Preferably, each flight attendant 50 in the passenger cabin 30 is equipped with a portable transmitter unit 24 so that any flight attendant experiencing a troublesome occurrence can alert the flight crew on the flight deck through actuation of his/her portable transmitter unit 24. Where the receiver unit 22 only processes one preselected activation signal to issue a general alert (the system does not differentiate between a hijacking and another troublesome situation), each portable transmitter unit 24 can transmit the preselected activation signal. Where the receiver unit 22 can process two or more preselected activation signals from each portable transmitter unit 24 of the system, each portable transmitter unit 24 can transmit the required two or more preselected activation signals. As discussed above, where the receiver unit 22 can process and the portable transmitter unit(s) 24 can transmit two preselected activation signals, preferably, the first preselected activation signal transmitted by each portable transmitter unit 24 is processed by the receiver unit 22 to alert the flight crew in the flight deck compartment 28 that a potential hijacking is taking place in the passenger cabin 30 and the second preselected activation signal transmitted by each portable transmitter unit is processed by the receiver unit 22 to alert the flight crew in the flight deck compartment that some other troublesome situation is occurring in the passenger cabin 30, such as but not limited to a confrontation between a flight attendant and a disruptive passenger.

Figure 7:
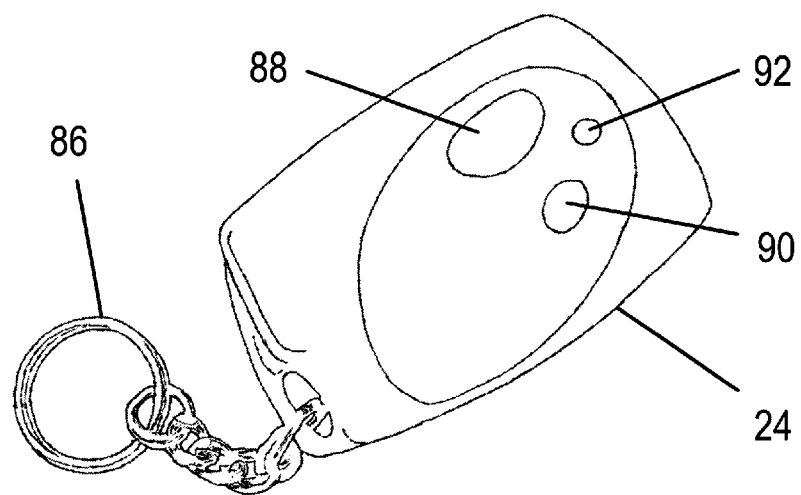
FIG. 7 is a perspective view of a typical portable transmitter unit of the flight attendant warning system of the subject invention that is located in the passenger cabin of an aircraft with a flight attendant.
Figure 8:
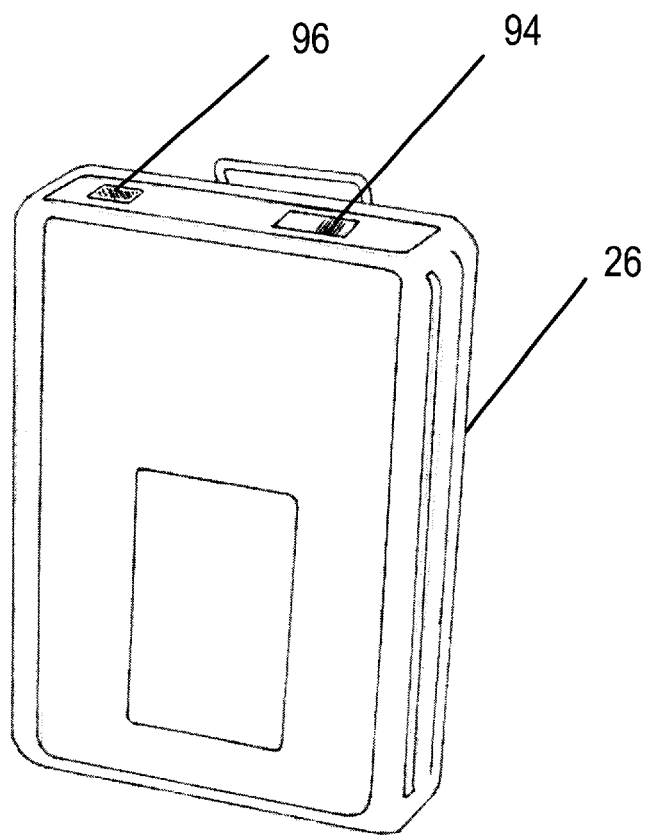
FIG. 8 is a perspective view of a typical portable receiver unit of the flight attendant actuated warning system of the subject invention that is located in the passenger cabin of the aircraft with a federal air marshal or flight attendant in the passenger cabin.

The transmitter for each portable transmitter unit 24 is housed in casing that, preferably, can be easily carried and concealed by a flight attendant in his/her pocket. For example, each portable transmitter unit should be no larger than about 2½ inches×about 3 inches×about 1 inches (approximately the size of a typical pager) and, preferably, about 1 inch×about 2 inches×about ½ of an inch (approximately the size of a remote for a keyless entry system commonly used on today automobiles). In fact, as shown in FIG. 7, each portable transmitter unit 24 can be made to look like a remote for an automobile keyless entry system and include a key ring 86 for holding fake or decoy keys so that any passenger noticing a portable transmitter unit 24 will mistake it for the remote of a keyless entry system. To enable the flight crews and maintenance crews to easily and quickly determine that a portable transmitter unit 24 is part of a particular system, each portable transmitter unit 24 of a particular system may include indicia thereon that identifies the portable transmitter unit as a unit of that particular system.

Each portable transmitter unit 24 will include at least one actuator switch for a system having a single level of alert, two actuator switches 88 and 90 for a system having two levels of alert (e.g. a hijacking alert and Flight Attendant Alert), and may include three or more actuator switches for a system having three or more levels of alert, and preferably, an LED light 92. Where the flight attendant actuated warning system utilizes only a single level of alert, the unit may include only one actuator switch (preferably a recessed push button switch such as switch 88 to help prevent the accidental actuation of the switch). When the switch is actuated, the switch 88 causes the portable transmitter unit 24 to transmit a preselected activation signal to the receiver unit 22. Where the flight attendant actuated warning system utilizes first and second levels of alert, each portable transmitter unit includes the actuator switches 88 and 90 (preferably recessed push button switches to help prevent the accidental actuation of the switch). Preferably, as shown in FIG. 7, the first actuation switch 88 is larger than the second actuation switch 90 so that the flight attendant can easily differentiate between the switches 88 and 90 through touch and without having to look at the switches. The actuation by a flight attendant of the first actuator switch 88 causes the portable transmitter unit 24 to transmit a first preselected activation signal (e.g., the preselected activation signal indicating a potential hijacking) to the receiver unit 22. The actuation by a flight attendant of the second actuator switch 90 causes the portable transmitter unit 24 to transmit a second preselected activation signal (e.g. the preselected activation signal indicating a troublesome situation or emergency other than a potential hijacking) to the receiver unit 22. The portable transmitter unit 24 transmits a preselected activation signal for as long as the actuator switch 88 or 90 of the unit is being actuated, e.g. for as long as a push button is being depressed by the flight attendant.

Typically, a conventional 12-volt battery powers the portable transmitter unit 24. Where the portable transmitter unit is equipped with an LED light 92, e.g. a red LED light, a steady illumination of the LED light, when the portable transmitter unit 24 is not in use, indicates that the battery should be replaced. When an actuator switch of the portable transmitter unit 24 is being actuated, the LED light 92 will flash to indicate to the flight attendant that the portable transmitter unit 24 is working properly and a preselected activation signal is being sent to the receive unit 22. If the LED light 92 is not flashing when one of the switches is actuated, there is a malfunction in the portable transmitter or the battery is generating insufficient power and should be replaced.

The receiver unit 22 must receive a preselected activation signal of the system from a portable transmitter unit 24 for a preselected time period, e.g. for one or two seconds, before the receiver unit 22 will initiate the activation of the alert lights, the audible alert buzzers and where included in the system, the radio transmitter and the change of the transponder code. By requiring any preselected activation signal of the system to be transmitted and received for the preselected time period prior to the initiation by the receiver unit 22 of the activation of the alert lights, audible alert buzzers, and radio transmitter and the change of the transponder code, false alerts through an accidental actuation of a portable transmitter unit 24 will be minimized. While a preselected activation signal from a portable transmitter unit 24 of the system will actuate the receiver unit 22 after the signal has been received for the preselected time period, a portable transmitter unit 24 can not be used to deactivate or reset the receiver unit 22 once the receiver unit has been activated by a signal from a portable transmitter unit. The receiver unit 22 can only be reset to the standby mode through the automatic sequence of the receiver unit or the use of the reset switch 62 of the receiver unit.

As discussed above, preferably, the receiver unit 22 of a system can be set to receive and process and each portable transmitter unit 24 of a system can be set to transmit any of several thousand preselected activation signals (coded signals), e.g. any of 8000 different coded signals. In a flight attendant actuated warning system to be used on a particular aircraft, the receiver unit 22 is programmed to receive and process and the one or more portable transmitter units 24 of the system are programmed to transmit a preselected activation signal (coded signal), two preselected activation signals (coded signals), or three or more preselected activation signals (coded signals). The preselected activation signal (coded signal) or activation signals (coded signals) utilized in each flight attendant actuated warning system will be unique to that system so that portable transmitter units 24 from a particular fight attendant actuated warning system can only be used with the receiver unit 22 of that system and no other system. The receiver unit 22 in the flight deck compartment can be reprogrammed, e.g. through the resetting of dipswitches in the receiver unit by the airline maintenance crews, to receive and process preselected activation signals (coded signals) other than the preselected activation signal or signals originally programmed into the receiver unit. However, the portable transmitter unit or units 24 can't be reprogrammed to transmit preselected activation signals (coded signals) other than the preselected activation signal or signals originally programmed into the portable transmitter units 24. Thus, the portable transmitter unit or units 24 of a system on a particular aircraft can only be utilized with that particular system and aircraft. If any of these portable transmitter units 24 become lost, stolen or otherwise misappropriated, the portable transmitter units 24 can't be used with another system on another aircraft. In addition, where one or more of the portable transmitter units 24 of a particular system become inoperative or are lost, stolen, or otherwise misappropriated, the receiver unit 22 of the system can be reprogrammed to receive and process new preselected activation signal(s) that are unique to that particular system and the portable transmitter units 24 of the system can be replaced with new portable transmitter units 24 programmed to transmit these new unique preselected activation signals (unique signals that are different from those originally used in the system). The ability to reprogram the receiver unit 22 of a system both protects the integrity of the system and eliminates the need to replace the receiver unit 22 of a system in the event a portable transmitter unit 24 malfunctions, becomes lost, is stolen or is otherwise misappropriated.

The preselected activation signal or signals (coded signal or signals) transmitted by the portable transmitter unit or units 24 of each flight attendant actuated warning system and received and processed by the receiver unit 22 of a system are transmitted at a frequency or frequencies outside a frequency range utilized by the avionic and navigational equipment on an aircraft so that the operation of the flight attendant actuated warning system will not interfere with the avionic and navigational equipment of the aircraft. While other frequencies may be used, an example of a frequency that might be utilized in the flight attendant actuated warning system is 433.92 MHz. According to Federal Communications Commission Regulations Title 47, Part 87, no aircraft communications or navigational equipment or ground communications or navigational facilities operate on or near this frequency.

As indicated above, the flight attendant actuated warning system may also include one or more portable receiver units 26. Any federal air marshal present on the aircraft 20 will carry a portable receiver unit 26 to alert the federal air marshal in the event of a flight attendant alert. In addition, where there are two or more flight attendants in the passenger cabin, preferably, each flight attendant will carry a portable receiver unit 26 so that when one flight attendant initiates an alert, the other flight attendants in the passenger cabin 30 will be alerted along with the crew on the flight deck and any federal air marshal present in the passenger cabin. Preferably, each portable receiver unit 26 is about 2½ inches×about 3 inches×about 1 inch (approximately the size of a typical pager) or smaller so that the portable receiver unit is inconspicuous and/or can be easily carried and concealed in a pocket, on a belt like a typical pager, or under a suit jacket. When actuated by a preselected activation signal of the system for the preselected activation period, preferably, each portable receiver unit 26 of the system emits an inaudible and nonvisual alert, such as a vibratory alert produced by the actuation of a small vibratory motor within the unit. With the nonvisual and inaudible alert, the identity of any federal air marshal will not be given away and, in the passenger cabin, only the federal air marshal and flight attendants will be aware of the alert. Each portable receiver 26 will have a reset switch, e.g. a push button switch, or an on/off switch 94 to terminate an alert and reset the portable receiver unit 26 to receive a future signal. Preferably, the portable receiver units 26 will be powered by a 12-volt battery and have a red LED light 96. A steady illumination of the LED light 96, when the portable receiver unit 26 is not in use, indicates that the battery should be replaced.

Where the flight attendant actuated warning system is being used on larger aircraft such but not limited to a Boeing 747, the system may include a repeater unit mounted about midway along the length of or toward the front of the passenger cabin. A repeater unit is a receiving and transmitting unit that will receive any of the preselected activation signals from any one of portable transmitter units 24 of the system and transmit or relay that same signal to the receiver unit 22 in the flight deck compartment. Thus, where a preselected activation signal transmitted by a portable transmitter unit 24 located toward the rear of the passenger cabin 30 might not be strong enough to reach the receiver unit 22 in the cockpit, the repeater unit can pick up the signal and retransmit the signal to the receiver unit 22 in the flight deck compartment. Like the receiver unit 22, the repeater unit will normally be powered by the aircraft's electrical system, include backup batteries in case of a power failure, and can be reprogrammed to transmit preselected activation signals other than those originally used in the system.

Figure 9:
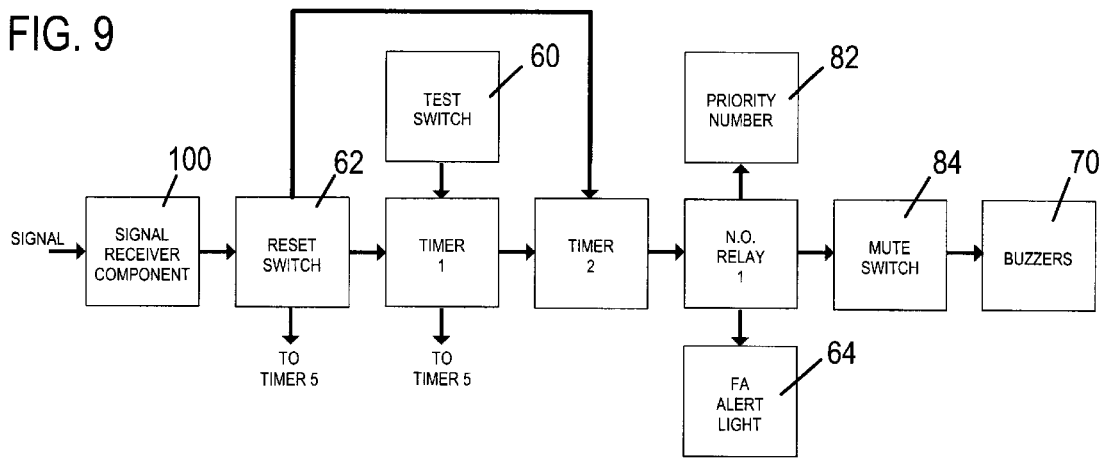
FIG. 9 is a schematic flowchart of a first electrical circuit that may be used in the receiver unit of a basic embodiment of the flight attendant actuated warning system of the subject invention.
Figure 11:
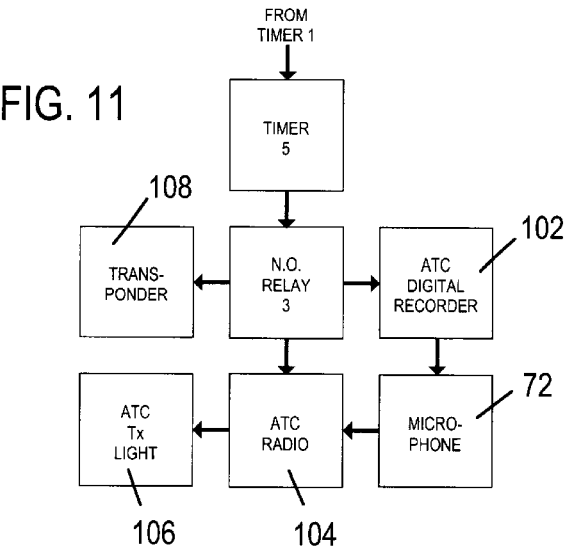
FIG. 11 is a schematic flowchart of an electrical circuit for the radio transmitter that may be used in the receiver unit of the flight attendant actuated warning system of the subject invention.

FIGS. 9 to 11 schematically represent a basic embodiment of the flight attendant actuated warning system of the subject invention having only a single alert level, a more sophisticated embodiment of the fight attendant actuated warning system having two alert levels, and an optional radio transmitter and transponder circuit that may be included in a basic or more sophisticated embodiment of the flight attendant actuated warning system. While these embodiments of the flight attendant actuated warning system are representative of the electrical circuits and components used in the flight attendant actuated warning system, other electrical circuits and components that perform the same functions as those in the FIGS. 9 to 11 may be substituted for those set forth in the examples of FIGS. 9 to 11. It should also be noted that while a single alert level system and a two alert level system are illustrated, the flight attendant actuated warning system of the subject invention may also be used with systems having any number of alert levels deemed appropriate, such as but not limited to three or four alert level systems.

The operation of a basic embodiment of the flight attendant actuated warning system will now be described in connection with FIG. 9. As shown in FIG. 9, a preselected activation signal, unique to the system, is received by a signal receiver component 100 of the receiver unit 22 (e.g. a two channel code lock receiver such as that sold by Velleman Components N.V. under the trade designation K6727). Receipt by the signal receiver component 100 of the preselected activation signal turns on the timer $T_1$. Provided the preselected activation signal is received by the signal receiver component 100 for the preselected activation period and power is sent to the timer for $T_1$ for the preselected activation period, e.g. 1 or 2 seconds, the timer $T_1$ turns on timer $T_2$ and the timer $T_5$ if the timer $T_5$ is included in the system. Once the timer $T_1$ has turned on the timer $T_2$ and the timer $T_5$ if the timer $T_5$ is included in the system, the timer $T_1$ automatically returns to a standby state where the timer $T_1$ is again ready to be actuated by the receipt of a preselected activation signal of the system through the signal receiver component 100 of the receiver unit 22. Once turned on by timer $T_1$, the timer $T_2$ initiates a preselected alert period (e.g. a period of 13 to 15 seconds) wherein the timer $T_2$, for the preselected alert period, closes a normally open relay (N.O. Relay$_1$) and sends power through the N.O. relay$_1$ to the alert light 64, buzzers 70, and the priority number indicator 82 to indicate the priority number of flight attendant sending the alert. At the end of the preselected alert period, the timer $T_2$ automatically returns to its standby state and returns the N.O. Relay$_1$ to its normally open state to thereby shut off the alert light, the buzzers and the priority number indicator. At any time during the activation period for timers $T_1$, $T_2$ and $T_5$, the power to the components of the receiver unit 22 controlled by these timers may be shut off by actuating and opening the reset switch 62 (a normally closed switch) to shut off the components and return the timers to their normal standby state so that the timers are again ready to actuated by the receipt of a preselected activation signal by the receiver component 100 of the receiver unit 22.

The operation of a more sophisticated embodiment of the flight attendant actuated warning system will now be described in connection with FIG. 10. As shown in FIG. 10, the receipt by the signal receiver component 100 (e.g. a two channel code lock receiver such as that sold by Velleman Components N.V. under the trade designation K6727) of the receiver unit 22 of a first preselected activation signal initiates the activation sequence of the receiver unit 22 to alert the flight crew in the flight deck compartment 28 that a potential hijacking is taking place in the passenger cabin 30. Receipt by the signal receiver component 100 of the first preselected activation signal turns on the timer $T_1$. Provided the first preselected activation signal is received by the signal receiver component 100 for the preselected activation period and power is sent to the timer for $T_1$ for the preselected activation period, e.g. 1 or 2 seconds, the timer $T_1$ turns on timer $T_2$ and the timer $T_5$ if the timer $T_5$ is included in the system. Once the timer $T_1$ has turned on the timer $T_2$ and the timer $T_5$ if the timer $T_5$ is included in the system, the timer $T_1$ automatically returns to a standby state where the timer $T_1$ is again ready to be actuated by the receipt through the signal receiver component 100 of the receiver unit 22 of the first preselected actuation signal of the system. Once turned on by timer $T_1$, the timer $T_2$ initiates a preselected alert period (e.g. a period of 13 to 15 seconds) wherein the timer $T_2$, for the preselected alert period, closes a normally open relay (N.O. Relay$_1$) and sends power through the N.O. relay$_1$ to the alert light 66 indicating a hijacking, buzzers 70, and the priority number indicator 82 to indicate the priority number of flight attendant sending the alert. At the end of the preselected alert period, the timer $T_2$ automatically returns to its standby state and returns the N.O. Relay$_1$ to its normally open state to thereby shut off the hijack alert light 66, the buzzers 70, and the priority number indicator 82. At any time during the activation period for timers $T_1$, $T_2$ and $T_5$, the power to the components of the receiver unit 22 controlled by these timers may be shut off by actuating and opening the reset switch 62 (a normally closed switch) to shut off the components and return the timers to their normal standby state so that the timers are again ready to actuated by the receipt of a preselected activation signal by the receiver component 100 of the receiver unit 22.

The receipt by the signal receiver component 100 (e.g. a two channel code lock receiver such as that sold by Velleman Components N.V. under the trade designation K6727) of the receiver unit 22 of a second preselected activation signal initiates the activation sequence of the receiver unit 22 to alert the flight crew in the flight deck compartment 28 that a troublesome situation is taking place in the passenger cabin 30 other than a hijacking. Receipt by the signal receiver component 100 of the second preselected activation signal turns on the timer $T_3$. Provided the second preselected activation signal is received by the signal receiver component 100 for the preselected activation period and power is sent to the timer for $T_3$ for the preselected activation period, e.g. 1 or 2 seconds, the timer $T_3$ turns on timer $T_4$. Once the timer $T_3$ has turned on the timer $T_4$, the timer $T_3$ automatically returns to a standby state where the timer $T_3$ is again ready to be actuated by the receipt through the signal receiver component 100 of the receiver unit 22 of the second preselected actuation signal of the system. Once turned on by timer $T_3$, the timer $T_4$ initiates a preselected alert period (e.g. a period of 13 to 15 seconds) wherein the timer $T_4$, for the preselected alert period, closes a normally open relay (N.O. Relay$_2$) and sends power through the N.O. relay$_2$ to the alert light 68 indicating a flight attendant alert, buzzers 70, and the priority number indicator 82 to indicate the priority number of flight attendant sending the alert. At the end of the preselected alert period, the timer $T_4$ automatically returns to its standby state and returns the N.O. Relay$_2$ to its normally open state to thereby shut off the flight attendant alert light 68, the buzzers 70, and the priority number indicator 82. At any time during the activation period for timers $T_3$ and $T_4$, the power to the components of the receiver unit 22 controlled by these timers may be shut off by actuating and opening the reset switch 62 (a normally closed switch) to shut off the components and return the timers to their normal standby state so that the timers are again ready to actuated by the receipt of a preselected activation signal by the receiver component 100 of the receiver unit 22.

As shown in FIGS. 9 and 10, the receiver unit 22 may be provided with a mute switch 84. Actuation of the mute switch opens a relay to turn off the buzzers 70 prior to the end of the preselected alarm period. This enables the flight crew to silence the system without resetting the other components of the system so that attention is not drawn to the receiver unit 22 should it appear that hijackers might gain access to the flight deck compartment prior to the end of the preselected alarm period.

As shown in FIG. 11, when the radio transmitter and the transponder code changing device are included in the flight attendant actuated warning system, when the timer $T_5$ is turned on, after a preselected waiting period, e.g. a 20 second delay, the timer $T_5$ closes a normally open relay (N.O. Relay$_3$) to supply power to the ATC digital recorder 102, the microphone 72, the ATC radio 104, the ATC $T_x$ light 106, and the device of the receiver unit that changes the code squawked by the transponder 108 to the international hijacking code. Once the timer $T_5$ closes N.O. Relay$_3$, the relay remains closed and the ATC digital recorder 102, the microphone 72, the ATC radio 104, and the ATC T, light 106 remain on until the reset button 62 is actuated to turn off these components and return the timer $T_5$ to it standby state. Thus, once the timer T5 turns on these components, the ATC radio transmitter 104 continues to transmit and the transponder 108 continues to squawk the international hijacking code until the reset switch is actuated. The receiver unit 22 could also be equipped with its own transponder to squawk the international hijacking code should the aircraft's normal transponder be turned off by a hijacker.

To differentiate between flight attendants, the signal receiver components 100 of these systems can be programmed to identify or to differentiate between different preselected activation signals transmitted to the receiver unit 22 by the different portable transmitter units 24 of the system. For example, in the system of FIG. 10, the first and second predetermined activating signals of each portable transmitter unit could be transmitted on a different frequency for each portable transmitter unit and the signal receiver component 100 could be programmed to identify the portable transmitter unit transmitting the alert signal by the frequency on which it is being transmitted and cause the priority number for that transmitter to be indicated on the indicator 82.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A flight attendant actuated warning system in an aircraft for alerting a flight crew in a flight deck compartment of the aircraft that a potential hijacking, passenger initiated disturbance, or other troublesome situation for which a flight attendant is seeking assistance is occurring in a passenger cabin of the aircraft, comprising:

a receiver unit mounted in the flight deck compartment of the aircraft; the receiver unit having a radio transmitter means that, when in operation, transmits on an international emergency freguency or other preselected frequency to transmit a call sign and flight number of the aircraft; the receiver unit having receiving and activating means for receiving a first preselected activation signal transmitted from a portable transmitter unit located in the passenger cabin of the aircraft and for activating an audible alert means and a visual alert means of the receiver unit to alert a flight crew in the flight deck compartment of the aircraft that a troublesome situation is occurring in the passenger cabin of the aircraft and, after a preselected time delay period, for automatically turning on the radio transmitter means to initiate radio transmissions over the radio transmitter means and for changing a code squawked by a transponder of the aircraft to the international hijacking code; the receiver unit including a reset means that may be actuated by a member of the flight crew in the flight deck compartment of the aircraft during the preselected time delay period to prevent the radio transmitter means from being turned on and the changing of the code squawked by the transponder and that may be actuated by a member of the flight crew in the flight deck compartment of the aircraft to terminate an existing audio and visual alert, radio transmissions from the radio transmitter means, and squawking by the transponder of the international hijacking code and return the receiving and activating means of the receiver unit to a standby state where the receiver unit is ready to again be activated by receipt of the first preselected activation signal;

a first portable transmitter unit located in the passenger cabin of the aircraft with a first flight attendant for actuation by the first flight attendant in the event a troublesome situation occurs in the passenger cabin of the aircraft; the first portable transmitter unit having means for transmitting the first preselected activation signal to activate the audio alert means and the visual alert means of the receiver unit and alert the flight crew in the flight deck compartment, through the audio alert means and the visual alert means, that a troublesome situation is occurring in the passenger cabin of the aircraft; the first preselected activation signal transmitted by the first portable transmitter unit having a transmission frequency outside a frequency range utilized by avionic and navigational equipment of the aircraft to avoid interfering with the function of the avionic and navigational equipment of the aircraft; and the first portable transmitter unit having transmitter actuating means for actuating the first portable transmitter unit to transmit the first preselected activation signal.

2. The flight attendant actuated warning system according to claim 1, wherein:

the receiving and activating means of the receiver unit must receive the first preselected signal for at least one second before activating the audible alert means and the visual alert means and initiating the preselected time period for turning on the radio transmitter means and changing the code squawked by the transponder.

3. The flight attendant actuated warning system according to claim 2, wherein:

the receiving and activating means of the receiver unit, when activated by the first preselected activation signal, activates the audible alert means and the visual alert means of the receiver unit for a preselected period of time and then automatically turns off the audible alert means and the visual alert means and returns to the standby state so that the receiving and activating means of the receiver unit is ready to again receive the first preselected signal to activate the audible alert means and the visual alert means of the receiver unit; and the reset means is the only means that can be actuated to terminate an existing audio and visual alert and return the receiving and activating means of the receiver unit to a standby state prior to the end of the preselected time period for the activation of the audible and visual alert.

4. The flight attendant actuated warning system according to claim 1, wherein:

the radio transmitter means of the receiver unit includes a microphone for automatically picking up and transmitting voices and other sounds from the flight deck compartment when the radio transmitter means is operating.

5. The flight attendant actuated warning system according to claim 1, including:

a portable receiver unit located in the passenger cabin of the aircraft with a second flight attendant or a federal air marshal; the portable receiver unit having a receiving and activating means for receiving the first preselected activation signal and activating a vibrating alert means of the portable receiver unit in responsive to the receipt by the portable receiver unit of the first preselected activation signal to alert the second flight attendant or the federal air marshal with the portable receiver of a troublesome situation without attracting attention to the second flight attendant or the federal air marshal with the portable receiver.

6. The flight attendant actuated aircraft warning system according to claim 1, wherein:

the first portable transmitter unit is preset and fixed to only transmit the first preselected activation signal; and the receiving and activating means of the receiver unit can be reset to receive a different first preselected activation signal to enable the use of a replacement portable transmitter unit with the different first preselected activation signal.

7. The flight attendant actuated aircraft warning system according to claim 1, including:

a second portable transmitter unit located in the passenger cabin of the aircraft with a second flight attendant for actuation by the second flight attendant in the event a troublesome situation occurs in the passenger cabin of the aircraft; the second portable transmitter unit having means for transmitting the first preselected activation signal to the receiver unit when the second flight attendant wants to alert the flight crew in the flight deck compartment of a troublesome situation in the passenger cabin.

8. The flight attendant actuated warning system according to claim 1, wherein:

the first portable transmitter unit has means for transmitting a second preselected signal to activate the audio and visual alert means of the receiver unit; the second preselected activation signal transmitted by the first portable transmitter unit having a transmission frequency outside a frequency range utilized by avionic and navigational equipment of the aircraft to avoid interfering with the function of the avionic and navigational equipment of the aircraft; the actuating means of the first portable transmitter having first means for actuating the first portable transmitter unit to transmit the first preselected activation signal when the first flight attendant wants to alert the flight crew in the flight deck compartment of a first troublesome situation; the actuating means of the first portable transmitter having second means for actuating the first portable transmitter unit to transmit the second preselected activation signal when the first flight attendant wants to alert the flight crew in the flight deck compartment of a second troublesome situation in the passenger cabin different from the first troublesome situation; and the receiving and activating means of the receiver unit can receive the first and second preselected activation signals from the first portable transmitter unit located in the passenger cabin of the aircraft; receipt by the receiving and activating means of the receiver unit of the first preselected activation signal activating the audio alert means of the receiver unit and activating the visual alert means of the receiver unit to indicate the first troublesome situation; and receipt by the receiving and activating means of the receiver unit of the second preselected activation signal activating the audio alert means of the receiver unit and activating the visual alert means of the receiver unit to indicate the second troublesome situation.

9. The flight attendant actuated warning system according to claim 8, wherein:

the troublesome situation indicated by the visual alert means of the receiver unit by the activation of the receiving and activating means of the receiver unit by the first preselected activation signal is a hijacking; and the troublesome situation indicated by the visual alert means of the receiver unit by the activation of the receiving and activating means of the receiver unit by the second preselected activation signal is a troublesome situation other than a hijacking.

10. The flight attendant actuated warning system according to claim 8, wherein:

the receiving and activating means of the receiver unit must receive the first or second preselected activation signal for at least one second before activating the audible alert means and the visual alert means.

11. The flight attendant actuated warning system according to claim 8, wherein:

the receiving and activating means of the receiver unit, when activated by either the first or second preselected activation signal, activates the audible alert means and the visual alert means of the receiver unit for a preselected period of time and then automatically turns off the audible alert means and the visual alert means and returns to the standby state where the receiving and activating means of the receiver unit is ready to again receive the first or second preselected signal to activate the audible alert means and the visual alert means of the receiver unit; and the reset means is the only means that can be actuated to terminate an existing audio and visual alert and return the receiving and activating means of the receiver unit to a standby state prior to the end of the preselected time period for the activation of the audible and visual alert.

12. The flight attendant actuated warning system according to claim 8, including:

a portable receiver unit located in the passenger cabin of the aircraft with a second flight attendant or a federal air marshal; the portable receiver unit having a receiving and activating means for receiving the first and second preselected activation signal and activating a vibrating alert means of the portable receiver unit in responsive to the receipt by the portable receiver unit of the first or second preselected activation signal to alert the second flight attendant or the federal air marshal with the portable receiver of a troublesome situation without attracting attention to the second flight attendant or the federal air marshal with the portable receiver.

13. The flight attendant actuated warning system according to claim 12, wherein:

the portable receiver unit is less than 2 inches×3 inches× 0.5 inches in size so that the portable transmitter unit can be easily concealed by the second flight attendant or federal air marshal.

14. The flight attendant actuated aircraft warning system according to claim 8, wherein:

the first portable transmitter unit is preset and fixed to only transmit the first and second preselected activation signals; and the receiving and activating means of the receiver unit can be reset to receive different first and second preselected activation signals to enable the use of a replacement portable transmitter unit with the different first and second preselected activation signals.

15. The flight attendant actuated aircraft warning system according to claim 8, including:

a second portable transmitter unit located in the passenger cabin of the aircraft with a second flight attendant for actuation by the second flight attendant in the event a troublesome situation occurs in the passenger cabin of the aircraft; the second portable transmitter unit having means for transmitting the first and second preselected activation signals to the receiver unit; the second portable transmitter having actuating means; the actuating means of the second portable transmitter having first means for actuating the second portable transmitter unit to transmit the first preselected activation signal when the second flight attendant wants to alert the flight crew in the flight deck compartment of the first troublesome situation; and the actuating means of the second portable transmitter having second means for actuating the second portable transmitter unit to transmit the second preselected activation signal when the second flight attendant wants to alert the flight crew in the flight deck compartment of the troublesome situation.

16. The flight attendant actuated aircraft warning system according to claim 8, including:

a second portable transmitter unit located in the passenger cabin of the aircraft with a second flight attendant for actuation by the second flight attendant in the event a troublesome situation occurs in the passenger cabin of the aircraft; the second portable transmitter unit having means for transmitting the third and fourth preselected activation signals to the receiver unit; the second portable transmitter having actuating means; the actuating means of the second portable transmitter having first means for actuating the second portable transmitter unit to transmit the third preselected activation signal when the second flight attendant wants to alert the flight crew in the flight deck compartment of the first troublesome situation; and the actuating means of the second portable transmitter having second means for actuating the second portable transmitter unit to transmit the fourth preselected activation signal when the second flight attendant wants to alert the flight crew in the flight deck compartment of the second troublesome situation;

the receiving and activating means of the receiver unit can receive the third and fourth preselected activation signals from the first portable transmitter unit located in the passenger cabin of the aircraft; receipt by the receiving and activating means of the receiver unit of the third preselected activation signal activating the audio alert means and activating the visual alert means of the receiver unit so that the visual alert means indicates the activation signal came from the second portable transmitter unit and the first troublesome situation; and receipt by the receiving and activating means of the receiver unit of the fourth preselected activation signal activating the audio alert means and activating the visual alert means of the receiver unit so that the visual alert means indicates the activation signal came from the second portable transmitter unit and the second troublesome situation; and receipt by the receiving and activating means of the receiver unit of the first or second preselected activation signal activating the visual alert means of the receiver unit so that the visual alert means indicates the activation signal came from the first portable transmitter unit.

17. The flight attendant actuated warning system according to claim 16, wherein:

the first and second portable transmitter units are each less than 2 inches×3 inches×0.5 inches in size so that the portable transmitter unit can be easily concealed by the first flight attendant.

18. The flight attendant actuated warning system according to claim 1, wherein:

the first portable transmitter unit is less than 2 inches×3 inches×0.5 inches in size so that the portable transmitter unit can be easily concealed by the first flight attendant.

* * * * *